(No Model.)
2 Sheets—Sheet 1.
R. L. HASSELL.
CONVEYER.
No. 493,772. Patented Mar. 21, 1893.
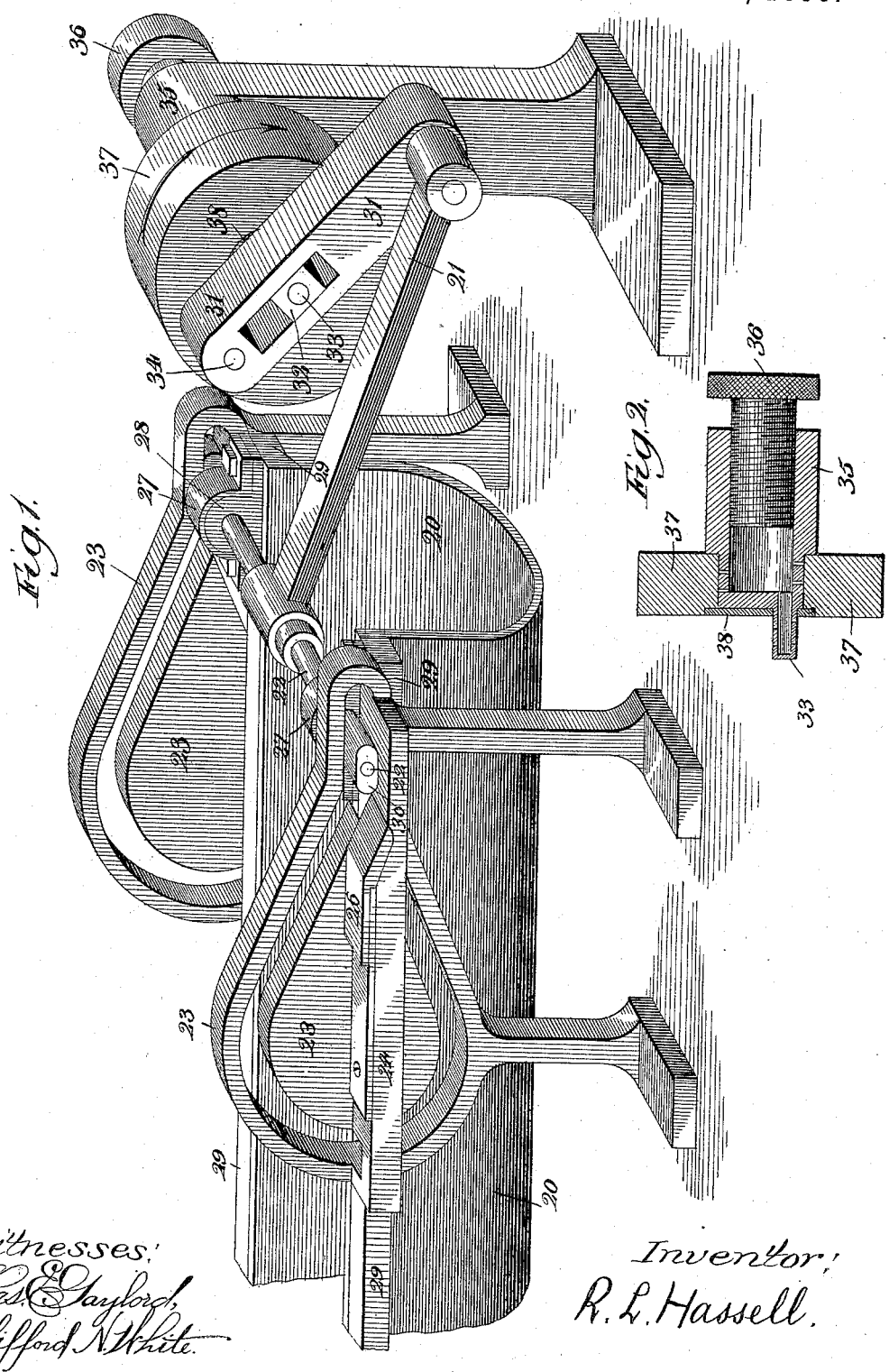
Witnesses:
Chas. E. Gaylord,
Clifford N. White.
Inventor:
R. L. Hassell.

(No Model.)
2 Sheets—Sheet 2.
R. L. HASSELL.
CONVEYER.
No. 493,772.
Patented Mar. 21, 1893.
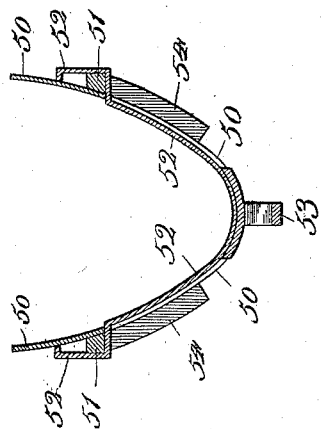
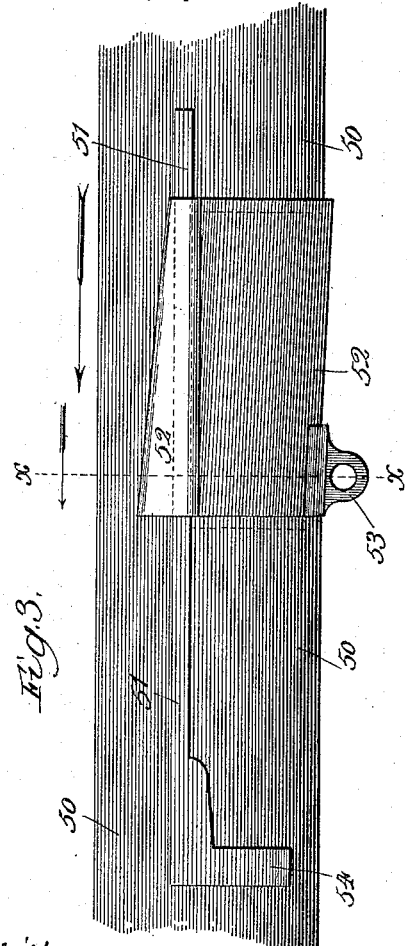
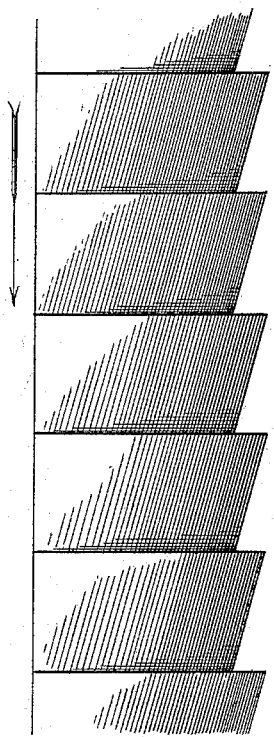
Witnesses:
Inventor:
R. L. Hassell.

UNITED STATES PATENT OFFICE.

RICHARD L. HASSELL, OF CHICAGO, ILLINOIS.

CONVEYER.

SPECIFICATION forming part of Letters Patent No. 493,772, dated March 21, 1893.

Application filed March 23, 1892. Serial No. 426,036. (No model.)

*To all whom it may concern:*

Be it known that I, RICHARD L. HASSELL, a citizen of the United States, residing at Chicago, in the county of Cook and State of Illinois, have invented certain new and useful Improvements in Conveyers, which are fully described and represented in the following specification and the accompanying drawings, forming a part of the same.

My present invention relates to improvements in reciprocating conveyers such as shown in my patent of July 26, 1892, No. 479,742.

In the accompanying drawings, Figure 1, is a perspective view of the driving mechanism and a part of the conveyer trough and its bearings; Fig. 2, a sectional view of a part of the driving mechanism; Fig. 3, a side view of a portion of a conveyer trough showing my improved valve; Fig. 4, a section of the same; and Fig. 5, a view of a modified form of conveyer trough.

I will first describe the driving mechanism shown at the right in Fig. 1. The driving pulley 37 revolves on the fixed shaft 35; this shaft 35 has a projecting pin, 33; the center of this pin 33 is set to one side of the center of the shaft 35 and carries a sleeve or bearing block, 32, which works in the slot of the arm 31; revolving motion is given to the slotted arm 31 by means of the pin 34 which projects from the face of the driving pulley 37; the opposite end of the arm 31 is connected to the pitman 21. The conveyer trough 20 is connected to the pitman by means of the bearings, 27, 28, and the shaft 22. The driving pulley 37 revolves with a uniform speed, but as the distance between the centers of the pins 33 and 34 is constantly varying during each revolution, the speed of that end of the slotted arm 31 to which the pitman is connected is also varying, and consequently the conveyer trough is driven with an increasing and decreasing speed during each revolution, moving with an increasing speed toward the end of the forward stroke, or that end of the stroke nearest the discharge end of the conveyer, and with a decreasing speed toward the end of the return. As the mechanism is shown in the drawings, the conveyer trough is moved to the left with an increasing speed and to the right with a decreasing speed. It should be understood that if the conveyer trough were driven by a simple crank having a short pitman the trough would move with an increasing and decreasing speed during each revolution. The purpose of the above described driving mechanism is to increase this action, it may not generally be necessary to use it in cases where a short pitman can be used; in such cases the motion given by a simple crank may be sufficient. For instance, if the slotted arm 31 and bearing 32 and pin 33 were removed; and the pitman 21 connected with the pin 34 projecting from the face of the driving pulley 37 the combination becomes a simple crank; with this arrangement the variation in the speed of the conveyer trough during each revolution of the crank depends on the length of the pitman, the shorter the pitman the greater the variation but the pitman should not be much shorter than the diameter of the circle described by the crank-pin. This variation is also increased in consequence of the conveyer trough moving in a curve by means of bearings such as shown in Fig. 1, or the several modifications described in my patent of July 26, 1892, No. 479,742. The direction of rotation of the driving pulley 37 should be as shown by the arrow. The working surfaces of the slot in the arm 31 may be made concave or V shaped.

Fig. 2, is a horizontal section through the center of the fixed shaft 35 and the driving pulley 37. The interior of the shaft is made hollow and filled with lubricating material which is communicated to the working parts through holes connecting the interior with the working surfaces. The lubricating material in the interior is retained and may be compressed by means of the screw 36. The disk 38 is fastened to the end of the shaft and acts as a collar to hold the driving pulley 37 in place. The slotted frames, 23, Fig. 1, are similar to those described in my patent of July 26, 1892, No. 479,742, and need not be described here. The shaft 22 is fastened to the top of the conveyer trough by means of the rubber bush or bearing 28, and the external metal band 27, as shown.

Fig. 3, is a side view of a portion of a conveyer trough showing my improved valve, and Fig. 4 a cross section of the same taken at the line *x, x*. In Fig. 3, the material being conveyed is supposed to be moving in the direction of the arrow, and consequently the discharge end of the conveyer is at the left. The valve 52 is formed of sheet metal similar to that of the conveyer trough. When closed, as shown in Fig. 3, the end of the valve nearest to the discharge end of the conveyer, laps a short distance on the inside of the conveyer trough; the opposite end of the valve laps on the outside of the trough. The upper part of the valve is formed, as shown, to embrace the strips 51 which are fastened to the sides of the trough. The lug 53 is fastened to the valve and forms a stop for the same when the valve is closed, and also forms a handle by means of which the valve may be opened and closed. The left hand end of the valve, below the strip 51, projects a short distance to the left beyond the end of the lug or stop 53, and this projecting end laps on the inside of the trough when the valve is closed. This valve may be opened, when the conveyer is running, by first pushing the valve a short distance to the right, then allowing the left hand end of the valve to drop until it can pass the outside of the conveyer trough, and then sliding the valve to the left until it meets the stop 54.

Fig. 5, is a side view of a conveyer trough formed of corrugated metal, this form of trough can be used with advantage when it is desired to convey material at an upward incline; the corrugations should be deeper at the bottom of the trough than at the sides, which may be smooth.

What I claim, and desire to secure by Letters Patent, is—

1. In combination with a reciprocating conveyer, the driving mechanism specified, consisting substantially, of the fixed shaft 35, the revolving disk or pulley 37, the projecting pin 33, and the slotted arm 31 connected at one end with the disk 37 and at the opposite end with the pitman 21, all constructed and arranged substantially as described, whereby the conveyer trough is moved with an increasing speed toward the end of the forward stroke or that end of the stroke nearest the discharge end of the conveyer.

2. In combination with a conveyer, the sliding valve 52, formed at the end nearest to the discharge end of the conveyer to lap on the inside of the trough, and at the opposite end to lap on the outside of the trough, as and for the purpose specified.

RICHARD L. HASSELL.

Witnesses:
 PETER LAUER,
 H. C. W. LAUBENHEINER.